(12) United States Patent
Chiu et al.

(10) Patent No.: US 7,939,165 B2
(45) Date of Patent: May 10, 2011

(54) PROTECTIVE SHEET AND METHOD FOR MANUFACTURING THE SAME

(75) Inventors: Ru-Jen Chiu, Taipei (TW); Chen-Hua Liu, Taipei (TW); Bar-Long Denq, Taipei (TW); Hung-Jen Chen, Taipei (TW)

(73) Assignee: Compal Electronics, Inc., Neihu, Taipei (TW)

( * ) Notice: Subject to any disclaimer, the term of this patent is extended or adjusted under 35 U.S.C. 154(b) by 0 days.

(21) Appl. No.: 12/041,365

(22) Filed: Mar. 3, 2008

(65) Prior Publication Data

US 2009/0047508 A1 Feb. 19, 2009

(30) Foreign Application Priority Data

Aug. 17, 2007 (TW) ................. 96130607 A

(51) Int. Cl.
*B32B 7/12* (2006.01)

(52) U.S. Cl. ...... 428/220; 428/332; 428/354; 427/385.5
(58) Field of Classification Search ................. 428/220, 428/332, 354, 385.5
See application file for complete search history.

(56) References Cited

U.S. PATENT DOCUMENTS

| | | | | |
|---|---|---|---|---|
| 4,946,728 A | * | 8/1990 | Ikeda et al. | 428/41.4 |
| 5,407,610 A | * | 4/1995 | Kohama et al. | 264/496 |
| 5,494,885 A | * | 2/1996 | Kudo et al. | 503/227 |
| 2003/0068491 A1 | * | 4/2003 | Otaki et al. | 428/343 |
| 2003/0122844 A1 | * | 7/2003 | Mueller et al. | 345/589 |
| 2003/0137579 A1 | * | 7/2003 | Tamura et al. | 347/217 |

* cited by examiner

*Primary Examiner* — Betelhem Shewareged
*Assistant Examiner* — Sathavaram I Reddy
(74) *Attorney, Agent, or Firm* — Thomas, Kayden, Horstemeyer & Risley, LLP

(57) ABSTRACT

A protective film comprises a substrate and a semi-cured protective layer over the substrate. The semi-cured protective layer is formed by curing a liquid mixture consisting of a thermosetting resin and a radiation curing resin.

15 Claims, 2 Drawing Sheets

PROTECTIVE SHEET AND METHOD FOR MANUFACTURING THE SAME

RELATED APPLICATIONS

This application claims priority to Taiwan Application Serial Number 96130607, filed Aug. 17, 2007, which is herein incorporated by reference.

BACKGROUND

1. Field of Invention

The present invention relates to a protective film and a method for manufacturing the same. More particularly, the present invention relates to a semi-cured protective film and a method for manufacturing the same.

2. Description of Related Art

With the advance of electronic technologies, the designing trend demands compact and slim electronic devices which are easily portable. Accordingly, portable consumer electronics, for example, laptops, portable TVs, cell phones, personal digital assistants (PDAs) and multimedia players such as MPEG audio layer 3 players are getting smaller and lighter.

The casing of a portable electronic device provides direct protection for the device but also affects the cooling effect, weight, and aesthetic thereof. Common casing materials for the portable electronic device include metallic materials such as aluminum-magnesium alloy and titanium alloy, or plastic materials such as carbon fiber, polycarbonate (PC) and ABS engineering plastic. Casings made of different materials have their own advantages and shortcomings. No matter what material is used as the casing of a portable electronic device, a protective layer will be formed over the outer surface of the casing so as to prevent the surface from being scratched. FIGS. 1(a) and 1(b) illustrate the known method for forming a protective layer over the casing. In FIGS. 1(a) and 1(b), a protective layer 14 is spray coated over the casing 12 by one or more spray coating processes, then, the protective layer 14 is fixed onto the surface of the casing 12 by a baking process 18. The quality of the protective films formed by the spray coating process 16 and the baking process 18 depends largely on the skill of the operator, the apparatus used for spray coating and baking, and the cleanness of the environment for spray coating and baking. The aforementioned factors render the fraction defective of the products too high and therefore the cost of the final products stays high.

Another known technique to prevent the surface of the portable electronic device from scratching is to overlay a protective film thereon. Refer to FIG. 2. FIG. 2 is a schematic cross-sectional view illustrating the known protective film. As shown in FIG. 2, a protective film 20 comprises a substrate 22, a protective layer 24, and an adhesive 26. In order to obtain a protective film 20 with protection ability, the protective layer 24 is spray coated over one side of the substrate 22, and the adhesive 26 is spray coated over the other side of the substrate 22 so that a protective film 20 with protection ability could be obtained. Still refer to FIG. 2, in the known technique, the protective film 20 is overlaid onto an acceptor 28 thereby forming a formed article 30. In this case, a substrate with a protective layer is overlaid onto the acceptor 28, and since the substrate is not removed, the protective layer formed is thicker. Furthermore, if the surface of an acceptor is curved or angled and not completely flat, to form an applicable protective film with better formability has to compromise the hardness of the protective layer. However, although a protective layer with lower hardness is easy to apply, it might decrease the protection ability of the protective film. On the other hand, while a protective layer with higher hardness might provide better protection, it is usually brittle and with lower formability during the manufacturing process. In addition, when the acceptor has a special angle, the protective film might exhibit defects such as whitening at the angle or poor adhesion with the casing. Therefore, although known protective films are easy to apply, their operability in later processing is extremely limited.

In view of the foregoing, it is desired to provide an easy-to-apply protective layer with a better yield and protective effect.

SUMMARY

The present invention provides a protective film with a semi-cured protective layer.

The present invention provides a method for manufacturing a protective film so that a protective layer with high hardness, good wear resistance, and good chemical tolerance could be obtained.

The present invention provides a first protective film, which comprises a substrate and a semi-cured protective layer over the substrate, wherein the semi-cured protective layer is overlaid onto an acceptor surface of an electronic device and then completely cured by a heat curing process or a radiation curing process. Since the protective layer of the protective film provided by the present invention is semi-cured, the protective film overlaying the surface of the acceptor has better formability during application. Afterward, the semi-cured protective layer is completely cured by the heat curing process or the radiation curing process, thereby providing a high-hardness protective film over the surface of the acceptor.

Before the heat curing process or the radiation curing process, the protective layer of the aforementioned protective film is semi-cured, and thereby with good flexibility and formability. Therefore, the protective layer can be overlaid onto acceptors with a variety of contours, and does not suffer from the limitation of shape and angle. After removing the substrate, the protective layer is cured by the heat curing process or the radiation curing process, thereby forming a protective layer having a surface with high hardness, wears resistance, and chemical tolerance. It should be noted that the protective layer of the protective film provided by the present invention is completely cured after being formed, thus producing less defects at the angle.

The present invention provides a second protective film, comprising a substrate, a semi-cured protective layer, and an adhesive layer. The semi-cured protective layer is coated over the substrate, the adhesive layer is coated over the semi-cured protective layer, and the semi-cured protective layer is overlaid onto the surface of the acceptor through the use of the adhesive layer.

In one example of the present invention, the substrate of the aforementioned first and a second protective film can be a thin film material having a surface with good mold releasing. Therefore, the substrate can be removed after overlaying the protective film provided by the present invention onto the surface of the acceptor.

In one example of the present invention, the first and the second protective film further comprise a releasing layer, which is disposed between the substrate and semi-cured protective layer. The releasing layer could also be used to remove the substrate.

The present invention also provides a method for manufacturing a protective film. First, a substrate and a liquid mixture consisting of a thermosetting resin and a radiation curing resin are provided. The liquid mixture is coated over a substrate to form a mixed layer. Afterward, a heat curing process is performed so that the mixed layer is transformed into a semi-cured protective layer. In the present invention, an adhesive layer can also be formed over the semi-cured protective layer. The adhesive layer can overlay the semi-cured protective layer onto the surface of the acceptor. After that, the substrate is removed and then a heat curing process or a radiation curing process is performed to completely cure the semi-cured protective layer. The mixture consisting of the thermosetting resin and the radiation curing resin can selectively comprise a solvent to evenly distribute the composition of the mixture. The thermosetting resin and the radiation curing resin of the mixture can be the monomer or the oligomer of the resins.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
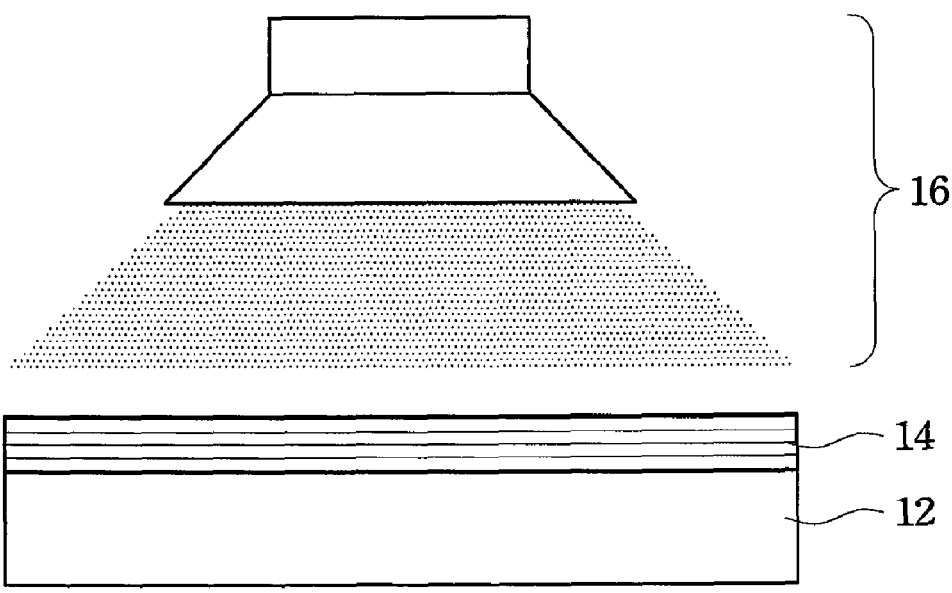
FIGS. 1(a) and 1(b) illustrate the known technique for forming a protective layer over the casing.
Figure 1B:
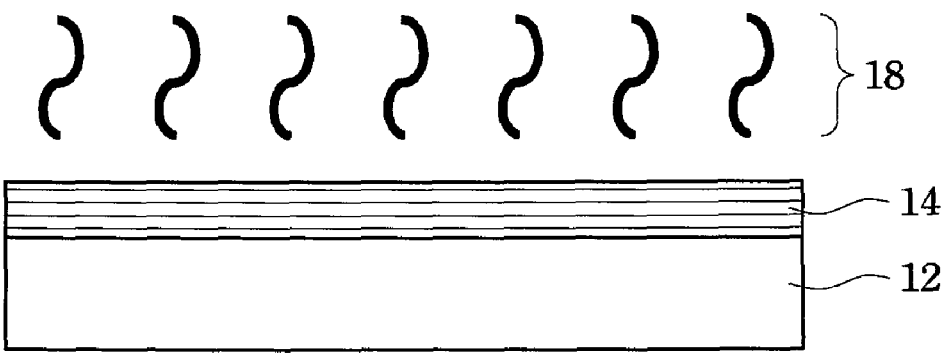
Figure 2:
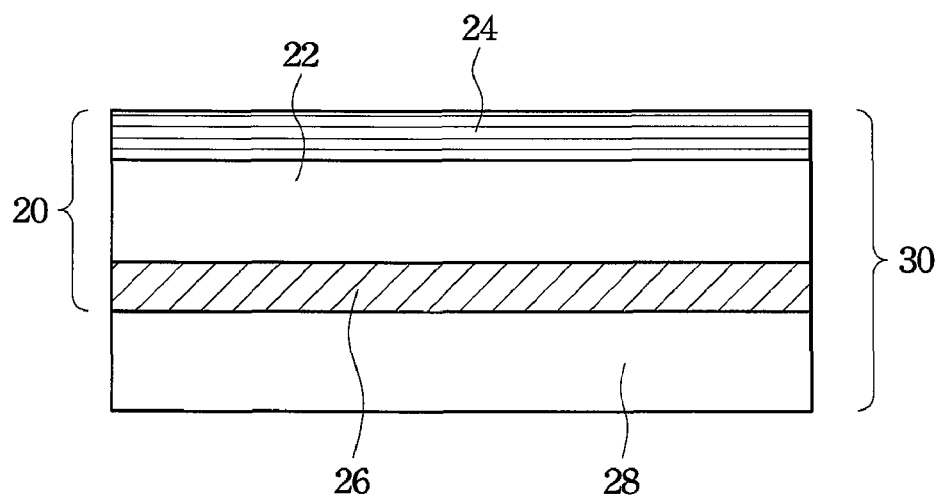
FIG. 2 is a cross-sectional diagram illustrating another known protective film.

It is to be understood that both the foregoing general description and the following detailed description are by examples, and are intended to provide further explanation of the invention as claimed.

Reference will now be made in detail to the present embodiments of the invention, examples of which are illustrated in the accompanying drawings. Wherever possible, the same reference numbers are used in the drawings and the description to refer to the same or like parts.

Figure 3:
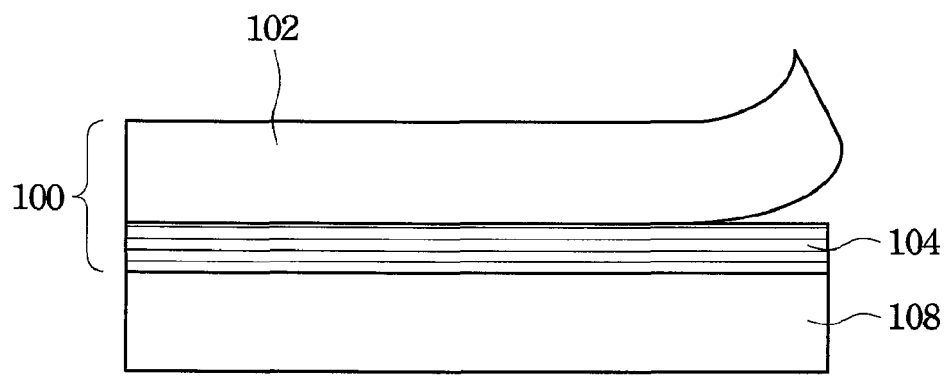
FIG. 3 is a cross-sectional diagram illustrating a protective film according to one embodiment of the present invention.

FIG. 3 is a cross-sectional diagram illustrating a protective film according to one embodiment of the present invention. As shown in FIG. 3, a protective film 100 comprises a substrate 102 and a semi-cured protective layer 104. The thickness of the substrate 102 is about 4 µm to 800 µm. The substrate 102 is acrylic resin film, polyester resin film, polystyrene resin film, polypropylene resin film, polyvinyl chloride resin film, polyethelyne resin film, polycarbonate resin film, polyurethane resin film, aluminum metal film, copper metal film, or cellulose film, for example. The thickness of the semi-cured protective layer 104 is about 1 µm to 60 µm. The semi-cured protective layer 104 is consisting of the thermosetting resin and the radiation curing resin.

The thermosetting resin of the semi-cured protective layer 104 may be acrylic resin, acrylate resin, vinyl resin, polyester resin, epoxy resin, polyurethane resin, or combinations thereof. The radiation curing resin is a monomer and/or oligomer, wherein the monomer is methyl acrylate, acrylic ester, vinyl compound, vinyl ether or epoxy with single functional group, bi-functional groups, or multi-functional groups. The oligomer is unsaturated polyester, glycidate, polyurethane acrylate, polyester acrylate, polyether acrylate, acrylated polyacrylic resin, or epoxy resin.

The method for manufacturing a protective film 100 is illustrated. First, a substrate 102 is provided. Then, a liquid mixture consisting of a thermosetting resin and a radiation curing resin is provided and then coated over the substrate 102 so that a mixed layer (not shown) is formed. Afterward, a heat curing process is performed in order to transform the mixed layer into a semi-cured protective layer 104. Lastly, a protective film 100 is formed.

In order to apply the protective film 100, first, the semi-cured protective layer 104 of the protective film 100 is overlaid onto the surface of the acceptor 108. Then the protective film 100 is pressed or heated from the other side, so that the semi-cured protective layer 104 is adhered/fixed onto the surface of the acceptor 108. Afterward, remove the substrate 102 so that the protective layer 104 is overlaid onto the surface of the acceptor 108. Lastly, select a heat curing process or a radiation curing process or both according to the resin type of the protective layer 104 in order to cure the protective layer 104. Thus a protective film with high hardness, wear resistance, and chemical tolerance is formed over the surface of the acceptor 108.

Figure 4:
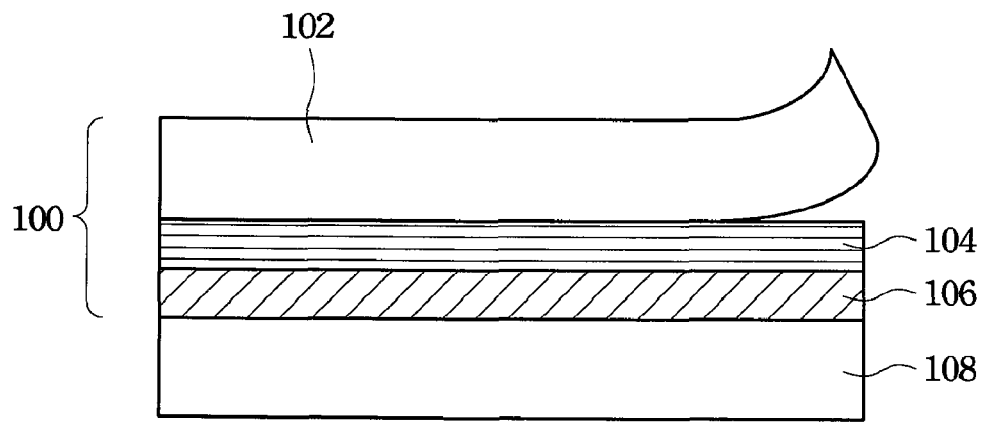
FIG. 4 is a cross-sectional diagram illustrating another protective film according to another embodiment of the present invention.

FIG. 4 is a cross-sectional diagram illustrating another protective film according to another embodiment of the present invention. As shown in FIG. 4, the protective film 100 comprises sequentially a substrate 102, a semi-cured protective layer 104, and an adhesive layer 106. The adhesive of the adhesive layer 106 is acrylic resin, urethane resin, vinyl resin, polyester resin, polystyrene resin, polypropylene resin, polyethelyne resin, or polycarbonate resin. The adhesive layer 106 formed by the adhesive has a thickness of about 1 µm to 15 µm.

The method for manufacturing the protective film 100 is illustrated. First, a substrate 102 is provided. Then, a liquid mixture consisting of a thermosetting resin and a radiation curing resin is provided and coated over the substrate 102 so that a mixed layer (not shown) is formed. Afterward, a heat curing process is performed so that the mixed layer is transformed into a semi-cured protective layer 104. Lastly, an adhesive is coated over the semi-cured protective layer 104 to form an adhesive layer 106. Thus a protective film 100 is formed.

In the examples of FIGS. 3 and 4, whether to use an adhesive layer 106 depends on the material of the acceptor 108. When the material of the acceptor 108 makes the adhesiveness between the surface of the acceptor 108 and the protective layer 104 poor, an adhesive layer 106 is required. When the material of the acceptor 108 makes the adhesiveness between the surface of the acceptor 108 and the protective layer 104 desirable, the protective film 100 can adhere tightly onto the surface of the acceptor 108 even in the absence of an adhesive layer 106.

Moreover, in the examples of FIGS. 3 and 4, substrate 102 can be a thin film material having a surface with good mold releasing property. Therefore, after overlaying the protective film 100 onto the surface of the acceptor 108, the substrate can be removed easily. Alternatively, a releasing agent layer coated between the substrate and the semi-cured protective layer can also be used to facilitate the removal of the substrate.

On one hand, utilizing the protective film of the present invention provides excellent protection for the casing of the acceptor (for example, electronic device). On the other hand, the protective film is easy to store and thus improves the yield of the final product. In addition, a pattern can be formed over the surface of the acceptor by using the protective film of the present invention. In FIG. 4, the designed pattern could be disposed between the protective layer 104 and the adhesive layer 106 during the manufacturing process of the protective film. The protective layer 104 is a resin material that is easy to process, thereby provides versatile appearance of the acceptor.

Following examples and test results provide better illustration to the method for manufacturing the protective film according to embodiments of the present invention and the surface hardness, wear resistance, and chemical tolerance of the protective film of the present invention.

EXAMPLE I

The substrate was a polyester resin film with the thickness of about 50 μm. A thermosetting acrylic releasing resin was coated over the substrate to form a releasing layer. A liquid resin was coated over the releasing layer by a blade coating method. The liquid resin was a mixture of a thermosetting resin and a radiation curing resin wherein the composition of the liquid resin layer was 80-120 parts (for example, gram) of thermosetting resin, 14-25 parts of 1,6-hexane diisocyanato trimer, 80-120 parts of radiation curing resin, 3-5 parts of photo-initiator, and 100-200 parts of ethyl acetate solvent. The liquid resin was baked at 120° C. for 2 minutes so that the surface finger thereof could be dried and a semi-cured protective layer with the thickness of about 10 μm could be formed thereon thereby forming a protective film with a semi-cured protective layer.

The protective film was adhered/fixed onto a plastic member by a thermo-compression process so that the semi-cured protective layer was overlaid onto the surface of the plastic member. Then the substrate was peeled off to obtain a formed article. The surface of the formed article was irradiated by an ultra violet light with energy of 1000 mJ/cm² so that the semi-cured protective layer was completely cured.

EXAMPLE II

The method for manufacturing the formed article was the same as Example I except that the composition ratio of the liquid resin layer was 20-60 parts of thermosetting resin, 3-13 parts of 1,6-1,6-hexane diisocyanato trimer, 140-180 parts of radiation curing resin, 4-8 parts of photo-initiator, and 100-200 parts of ethyl acetate solvent.

The formed articles of Example I and II were evaluated by the following standard procedures to assess the surface hardness, chemical tolerance, and wear resistance thereof.
[Hardness Test]
A load of 500 g was applied using a pencil hardness tester. The pencil used was Mitsubishi test pencil (manufactured by Mitsubishi Pencil K. K.). The test method used a test pencil with known hardness (from 9 H to 6 B) to move over the completely cured surface of the protective layer at fixed 45 degree and fixed pressure. The surface was observed with naked eye and the pencil hardness was indicated by the highest hardness of the test pencil where the cured surface was not scratched at all.
[Chemical Tolerance Test]
A piece of gauze was soaked in ethanol and then rubbed against the completely cured surface of the protective layer under a load of 500 g for 400 cycles. The surface was observed with naked eye and then graded according to the condition of the surface as follows:
⊚ surface un-damaged
○ surface slightly damaged
Δ surface moderately damaged
× surface seriously damaged

[Wear Resistance Test]
RCA wear resistant test was used. A load of 175 g was applied to the completely cured protective layer surface for 50 cycles. The surface was observed with naked eye and then graded according to the abrasion condition of the surface as follows:
⊚ surface un-abraded
○ surface slightly abraded
Δ surface moderately abraded
× surface seriously abraded The test results were shown in table 1. The formed articles of Example I and II both exhibited excellent performances on surface hardness, wear resistance, and chemical tolerance.

TABLE 1

| | Surface Hardness | Chemical Tolerance | Wear Resistance |
|---|---|---|---|
| Example I | 2H | ⊚ | ⊚ |
| Example II | 2H | ⊚ | ⊚ |

In view of the foregoing, the present invention provides a semi-cured protective layer consisting of a thermosetting resin and a radiation curing resin, so as to obtain a novel protective film. In addition, by overlaying the protective film of the present invention and then completely curing the semi-cured protective layer, a formed article with good surface hardness, wear resistance and chemical tolerance could be obtained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A protective film, comprising:
a substrate; and
a semi-cured protective layer disposed over the substrate, wherein the semi-cured protection layer comprises 80-120 weight parts of thermosetting resin, 14-25 weight parts of 1,6-hexane diisocyanato trimer, 3-5 weight parts of photo-initiator and 80-120 weight parts of UV curing resin.
2. The protective film of claim 1, further comprising an adhesive layer disposed over the semi-cured protective layer.
3. The protective film of claim 1, wherein the substrate is a film material with releasing property.
4. The protective film of claim 1, further comprising a release layer disposed between the substrate and the semi-cured protective layer.
5. The protective film of claim 1, wherein the substrate is selected from a group consisting of acrylic resin film, polyester resin film, polystyrene resin film, polypropylene resin film, polyvinyl chloride resin film, polyethelyne resin film, polycarbonate resin film, polyurethane resin film, aluminum metal film, copper metal film, and cellulose film.
6. The protective film of claim 2, wherein an adhesive of the adhesive layer is selected from a group consisting of acrylic resin, urethane resin, vinyl resin, polyester resin, polystyrene resin, polypropylene resin, polyethelyne resin, and polycarbonate resin.
7. The protective film of claim 1, wherein a thickness of the substrate is about 4 μm to about 800 μm.
8. The protective film of claim 1, wherein a thickness of the semi-cured protective layer is about 1 μm to about 60 μm.

9. The protective film of claim 2, wherein a thickness of the adhesive layer is about 1 μm to about 15 μm.

10. The protective film of claim 1, wherein the thermosetting resin of the semi-cured protective layer is selected from the group consisting of acrylic resin, acrylate resin, vinyl resin, polyester resin, epoxy resin, polyurethane resin, and combinations thereof.

11. The protective film of claim 1, wherein the UV curing resin of the semi-cured protective layer is monomer or oligomer.

12. The protective film of claim 11, wherein the monomer is methyl acrylate, acrylate, vinyl, vinyl ether, or epoxy with single functional group, bi functional group, or multi-functional group.

13. The protective film of claim 11, wherein the oligomer is unsaturated polyester, cyclic glycidate, polyurethane acrylate, polyester acrylate, polyether acrylate, acrylated polyacrylic resin, or epoxy resin.

14. The protective film of claim 1, wherein the protective film is overlaid onto a casing of an electronic device.

15. A protective film, comprising:
A substrate, and
A semi-cured protective layer disposed over the substrate, wherein the semi-cured protective layer comprises 20-60 weight parts of thermosetting resin, 3-13 weight parts of 1,6-hexane diisocyanate trimer, 4-8 weight parts of photo-initiator and 140-180 weight parts of UV curing resin.

* * * * *